United States Patent
Osawa et al.

(10) Patent No.: US 9,638,510 B2
(45) Date of Patent: May 2, 2017

(54) OPTICAL TOMOGRAPHY OBSERVATION APPARATUS

(71) Applicant: Hitachi—LG Data Storage, Inc., Tokyo (JP)

(72) Inventors: Kentaro Osawa, Tokyo (JP); Naoko Senda, Tokyo (JP); Daisuke Tomita, Tokyo (JP)

(73) Assignee: HITACHI—LG DATA STORAGE, INC., Tokyo (JP)

( * ) Notice: Subject to any disclaimer, the term of this patent is extended or adjusted under 35 U.S.C. 154(b) by 52 days.

(21) Appl. No.: 14/612,345

(22) Filed: Feb. 3, 2015

(65) Prior Publication Data

US 2015/0260503 A1    Sep. 17, 2015

(30) Foreign Application Priority Data

Mar. 14, 2014    (JP) .................. 2014-050994

(51) Int. Cl.
*G01B 9/02*    (2006.01)

(52) U.S. Cl.
CPC ..... *G01B 9/02083* (2013.01); *G01B 9/02091* (2013.01)

(58) Field of Classification Search
CPC .................. G01B 9/02083; G01B 9/02091
USPC .................................. 356/479, 497
See application file for complete search history.

(56) References Cited

U.S. PATENT DOCUMENTS

| 2004/0239938 A1* | 12/2004 | Izatt | .......... G01B 9/02004 356/479 |
|---|---|---|---|
| 2012/0300217 A1 | 11/2012 | Yuasa | |

* cited by examiner

*Primary Examiner* — Jonathan Hansen

(57) ABSTRACT

An optical measurement apparatus has a light source that emits a laser beam that is branched into signal light and reference light. An objective lens condenses the signal light on a measurement target to cause the measurement target to be irradiated; and a condensing position of the signal light is scanned in an optical axis direction. An interference optical system combines the signal light reflected or scattered from the measurement target with the reference light, and generates a plurality of interfering light beams having phase relationships different from one another that are detected by photodetectors. The detection signals are output as electrical signals; and a signal processing unit performs a predetermined arithmetic operation on the plurality of detection signals. The signal processing unit subtracts reflection light components from a predetermined portion of the measurement target from the plurality of detection signals or signals generated using the detection signals.

18 Claims, 10 Drawing Sheets

FIG. 6

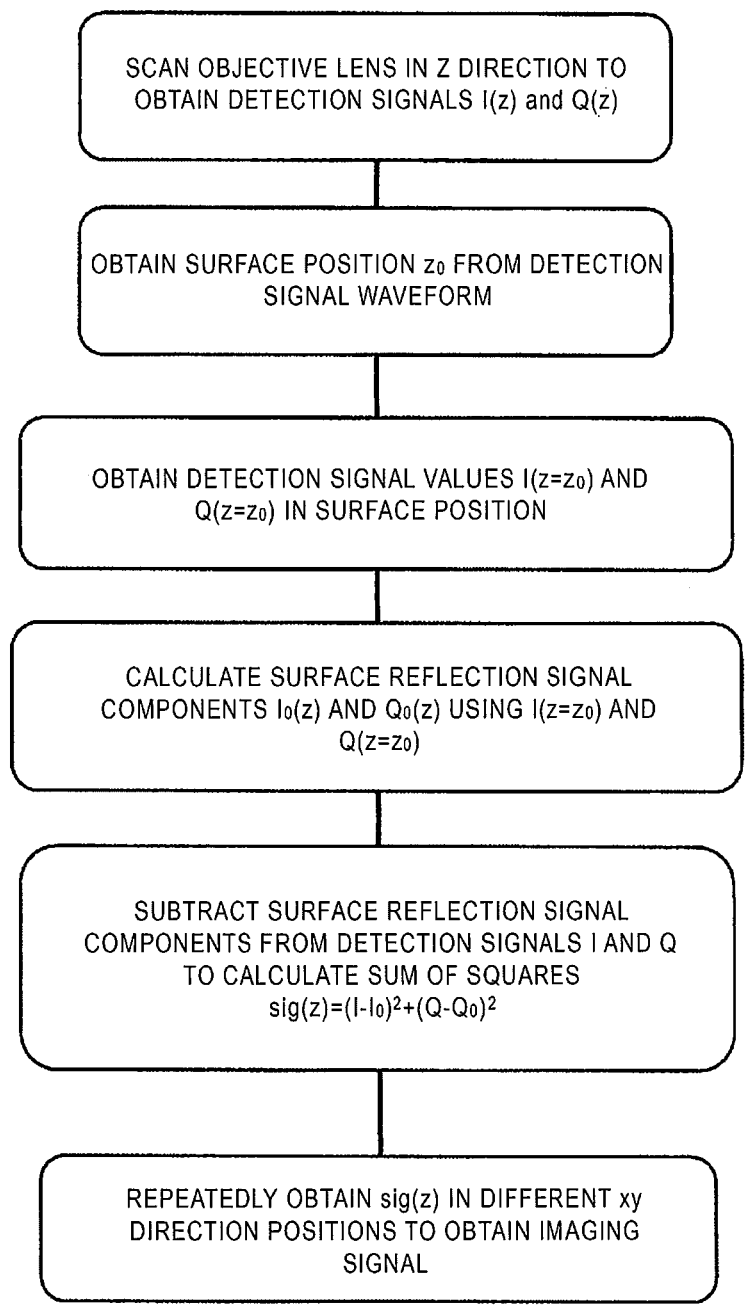

SCAN OBJECTIVE LENS IN Z DIRECTION TO OBTAIN DETECTION SIGNALS $I(z)$ and $Q(z)$ OBTAIN SURFACE POSITION $z_0$ FROM DETECTION SIGNAL WAVEFORM OBTAIN DETECTION SIGNAL VALUES $I(z=z_0)$ AND $Q(z=z_0)$ IN SURFACE POSITION CALCULATE SURFACE REFLECTION SIGNAL COMPONENTS $I_0(z)$ AND $Q_0(z)$ USING $I(z=z_0)$ AND $Q(z=z_0)$ SUBTRACT SURFACE REFLECTION SIGNAL COMPONENTS FROM DETECTION SIGNALS I AND Q TO CALCULATE SUM OF SQUARES
$sig(z)=(I-I_0)^2+(Q-Q_0)^2$ REPEATEDLY OBTAIN $sig(z)$ IN DIFFERENT xy DIRECTION POSITIONS TO OBTAIN IMAGING SIGNAL

OPTICAL TOMOGRAPHY OBSERVATION APPARATUS

CROSS-REFERENCE TO RELATED APPLICATION

This is application claims the priority of Japanese Patent Application No. 2014-050994 Filed Mar. 14, 2014, which is incorporated herein by reference in its entirety.

BACKGROUND OF THE INVENTION

Field of the Invention

The present invention relates to an optical tomography observation apparatus that observes a measurement target using interference of light.

Background Art

In recent years, an optical coherence tomography (OCT) that obtains an image of a surface structure or an inner structure of a measurement target by using interference of light has attracted attention. Since the OCT has no invasiveness to a human body, the application of the OCT to a medical field or a biological field has been especially expected, and an apparatus that forms an image such as an ocular fundus or a cornea has been put to practical use in an ophthalmological field. For example, as described in U.S. Patent Publication No. 2012-0300217, in the OCT, light from a light source is branched into two, that is, signal light applied to the measurement target and reference light reflected by a reference light mirror without being applied to the measurement target. The signal light reflected from the measurement target is combined with the reference light, and interference is caused in the combination light to obtain a signal.

The OCT is largely classified into a time domain OCT and a Fourier domain OCT according to a scanning method (hereinafter, referred to as a z-scan) in an optical axis direction of a measurement position. In the time domain OCT, the z-scan is performed by using a low coherence light source as a light source and scanning a reference light mirror, at the time of the measurement. Thus, only components which are included in the signal light and have the same optical path length as that of the reference light interfere, and envelope detection is performed on an obtained interference signal to demodulate a desired signal. Meanwhile, the Fourier domain OCT is classified into a wavelength scanning OCT and a spectral domain OCT. In the wavelength scanning OCT, the z-scan is performed by using a wavelength scanning light source capable of scanning a wavelength of emission light and scanning the wavelength at the time of the measurement, and Fourier transform is performed on wavelength dependence (interference spectra) of detected interfering light intensity to demodulate a desired signal. In the spectral domain OCT, the z-scan is performed by using a broad-bandwidth light source as a light source, spectrally separating generated interfering light by a spectrometer, and detecting interfering light intensity (interference spectra) for each wavelength component so as to correspond to the z-scan. A desired signal is demodulated by performing Fourier transform on the obtained interference spectra.

In general, when a living body is measured in the OCT, reflection light from inside of a measurement target is extremely smaller than surface reflection light of the measurement target (or reflection light from an interface between the measurement target and a measurement target holding section such as a cover glass or a culture container of a cell). For example, a case where a cell within a culture container filled with a culture medium is measured will be described as shown in FIG. 1. An index of refraction of a typical culture container (made of polystyrene) is approximately 1.59, an index of refraction of a cell is approximately 1.37, and reflectance of an interface between the culture container and the cell is estimated as a value of approximately 0.55% from the indices refraction. Meanwhile, when an index of refraction of the culture medium is approximately 1.33, reflectance of an interface between the cell and the culture medium is approximately 0.022%. It is considered that reflection of an interface between different cells or reflectance in the cell are smaller values than the aforementioned values. Thus, the reflection light from inside of the measurement target may be buried in considerably intense surface reflection light, and, thus, it may be difficult to vividly visualize an inner structure near the surface of the measurement target.

In order to verify an influence of the surface reflection light, a measurement target in which two interfaces having a reflectance of 1% exist inside of a surface having a reflectance of 10% at a space of 5 um as shown in FIG. 2 is considered. A solid line of FIG. 3 represents an example of a signal waveform when an imaging signal is obtained along a z-scan axis shown in FIG. 2 by using an OCT apparatus having a vertical resolution of approximately 3 um. A peak of a second interface position can be clearly recognized. In contrast, a peak of a first interface position mostly disappears due to interference with a surface reflection light component, so that it is difficult to recognize presence of a first interface.

As means for suppressing the influence of the surface reflection, a method of subtracting the surface reflection light component from the imaging signal is considered.

FIG. 4 shows a result obtained by subtracting the surface reflection signal component (dashed line) from the imaging signal (solid line) shown in FIG. 3. It can be seen that a peak appears in a position (depth of 2 um) where there is no interface, a peak position of the first interface is shifted from an original depth of 5 um to a depth of approximately 6 um, and a signal that accurately reflects a structure of the measurement target is not obtained. As mentioned above, in the method of simply subtracting the surface reflection signal component from the imaging signal, since a light interference effect is not considered, it is difficult to sufficiently suppress the influence of the surface reflection light, and, thus, it is difficult to accurately capture the structure of the measurement target.

As stated above, in the OCT apparatus of the related art, it may be difficult to vividly visualize the structure near the surface due to the influence of the intense surface reflection light of the measurement target.

SUMMARY OF THE INVENTION (1) In order to solve the problems, according to an aspect of the present invention, there is provided an optical measurement apparatus. In the optical measurement apparatus, a laser beam emitted from a light source is branched into signal light and reference light, the signal light is condensed on a measurement target by an objective lens to be irradiated, and a condensing position of the signal light is scanned by condensing position scanning mean. By using an interference optical system, the signal light reflected or scattered from the measurement target is combined with the reference light, and three or more interfering light beams whose phase relationships are different from one another are generated and detected. Reflection light components from a predetermined portion where intensive reflection occurs are subtracted from detected three or more detection signals or signals generated using the detection signals. Thereafter, a predetermined arithmetic operation is performed on signals obtained through the subtraction to generate an imaging signal. Here, the detection signal refers to a signal generated by detecting the generated interfering light beam by a photodetector such as a photodiode, and is an electrical signal having amplitude in proportion to detected interfering light intensity. The imaging signal refers to a signal whose intensity corresponds to luminance of an image. The portion where the intensive reflection occurs refers to a portion having a higher reflectance than that of another portion in a measurement region. Since it is considered that the reflection light from the portion disturbs the vivid visualization of a structure of a surrounding portion thereof, the portion where the intensive reflection occurs may be a portion where the influence of the reflection light from the portion is removed by a user. Specifically, the portion includes a surface of the measurement target, a surface of any container when the container is illuminated with signal light, or a liquid surface of a liquid when the measurement target exists in the liquid such as a formalin solution. The "signals generated using the detection signals" refer to differential output signals of the detection signals or signals obtained by performing a predetermined arithmetic operation on the detection signals. The "reflection light components to be subtracted" refer to reflection light from a predetermined portion or/and back-scattered light.

Accordingly, since it is possible to suppress the influence of the intense reflection light from the predetermined portion such as the surface of the measurement target, it is possible to vividly visualize the structure near the predetermined portion.

(2) In the aspect, the objective lens that condenses the signal light on the measurement target may have a numerical aperture of 0.4 or more.

Accordingly, it is possible to achieve spatial resolution in an optical axis direction which is equal to or higher than that in the OCT apparatus of the related art without using a broad-bandwidth light source or a wavelength scanning light source.

(3) In the aspect, four interfering light beams may be generated in the interference optical system. The four interfering light beams may be formed such that the signal light and the reference light have different interference phases from each another by an integer multiple of approximately 90 degrees. Pairs of interfering light beams in which the signal light and the reference light have interference phases different from each another by approximately 180 degrees may be respectively detected by current differential photodetectors.

Accordingly, since the current differential photodetectors are used, even when intensity of the reference light is increased, since the detectors are hardly saturated, it is possible to increase an SN ratio of the signal as compared to a case where the current differential photodetectors are not used.

(4) In the aspect, the optical measurement apparatus may further include a second light source that emits light having a different wavelength from that of the laser beam; phase adjusting means for adjusting a phase of the reference light; and a control unit that controls the phase adjusting means. The light emitted from the second light source may be branched into second signal light and second reference light by the light branching means, and the second signal light and the second reference light may be combined after respectively passing through the same optical paths as those of the signal light and the reference light. The control unit controls the phase adjusting means such that intensity of interfering light generated by combining the second signal light and the second reference light is substantially constant.

Accordingly, even when a position of the measurement target is varied due to a disturbance, since a phase relationship between the signal light and the reference light is maintained to be constant, it is possible to precisely subtract the reflection light components from the portion such as the surface of the measurement target where the intensive reflection occurs from the detected three or more detection signals or the signals generated using the detection signals.

(5) In the aspect, a low coherence light source may be used as the second light source. Here, the low coherence light source is a light source that emits light having a coherence length of approximately 50 um or less, and includes, for example, a SLD light source, an ASE light source, or a LD light source in which a high-frequency current is superposed on a driving current.

Accordingly, it is possible to selectively detect only the reflection light component from the predetermined portion of the measurement target by adjusting an optical path length difference of the second reference light, so that it is possible to precisely maintain the phase relationship between the signal light and the reference light to be constant.

According to the present invention, it is possible to suppress the influence of the intense reflection light occurring in the predetermined portion such as the surface of the measurement target, so that it is possible to provide the optical measurement apparatus capable of vividly visualizing the structure near the predetermined portion.

Other objects, configurations and effects will be clear by the description of the following embodiments.

BRIEF DESCRIPTION OF THE DRAWINGS

FIG. 6 is a schematic diagram illustrating a signal processing method in the optical measurement apparatus of the present invention.

DETAILED DESCRIPTION OF THE INVENTION

Hereinafter, embodiments of the present invention will be described with reference to the drawings.

Embodiment 1

Figure 5:
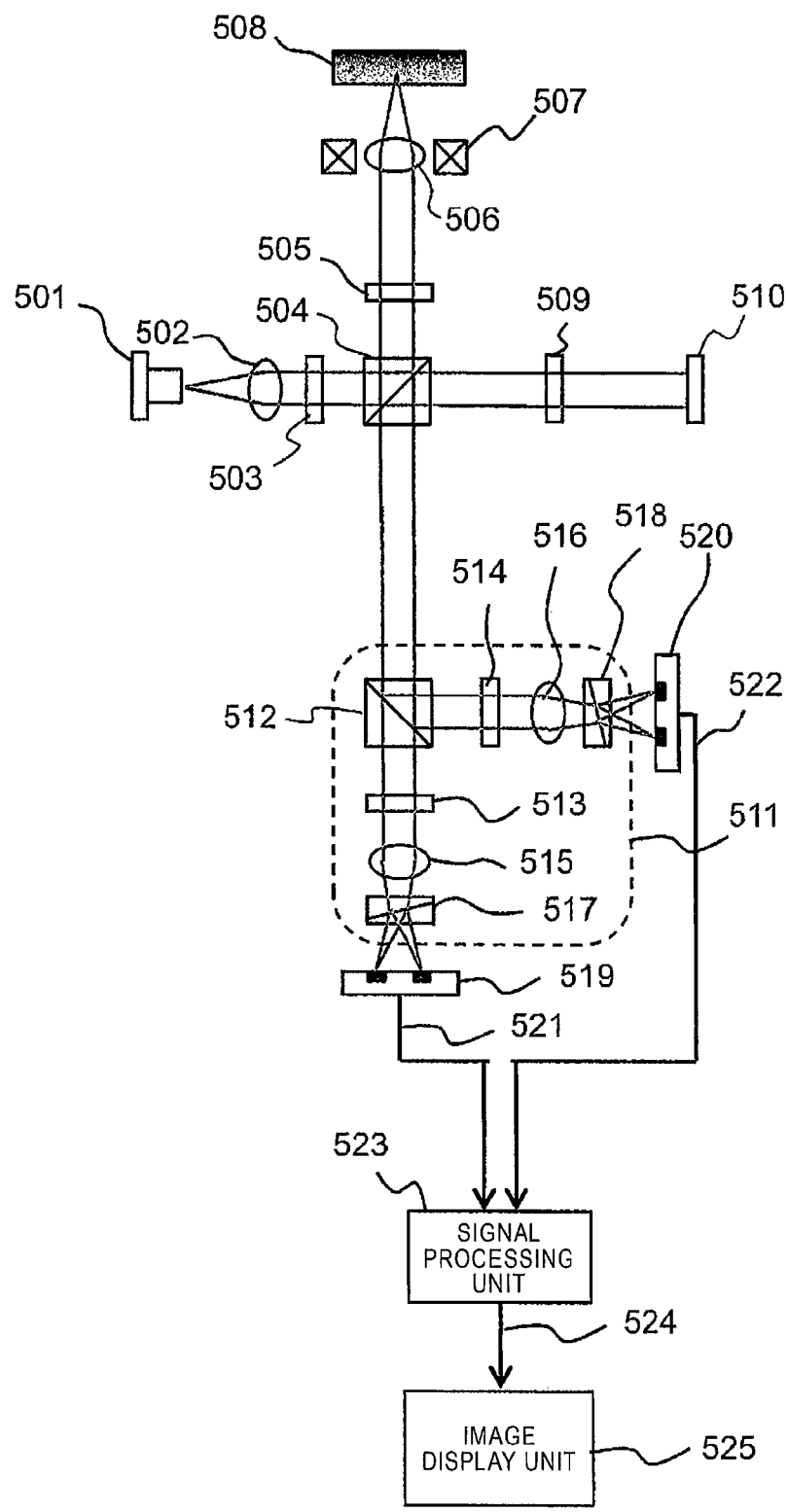
FIG. 5 is a schematic diagram illustrating an example of a configuration of an optical measurement apparatus of the present invention.

FIG. 5 is a schematic diagram showing a basic embodiment of an optical measurement apparatus according to the present invention.

A Laser beam emitted from a light source 501 is converted into parallel light by a collimating lens 502, and after a polarization of the light is rotated by a λ/2 plate 503 capable of adjusting an optical axis direction, the light is branched into two, that is, signal light and reference light by a polarizing beam splitter 504. The signal light is transmitted through a λ/4 plate 505 whose optical axis direction is set to approximately 22.5 degrees with respect to a horizontal direction, a polarization state of the signal light is converted to circular polarization from s-polarization. Thereafter, the signal light is condensed on a measurement target 508 by an objective lens 506 having a numerical aperture of 0.4 or more to be irradiated. Here, the objective lens 506 is scanned by an objective lens actuator 507, and, thus, scanning of a condensing position (measurement position) of the signal light by the objective lens 506 is repeated. A reflection light component, which is included in the signal light reflected or scattered from the measurement target and is reflected from a focal position of the objective lens, is converted into parallel light by the objective lens 506. Subsequently, a polarization state of the signal light is converted to p-polarization from circular polarization by the λ/4 plate 505, and the signal light is incident on the polarizing beam splitter 504. Meanwhile, the reference light is transmitted through a λ/4 plate 509, and a polarization state of the reference light is converted from p-polarization to circular polarization. Thereafter, the reference light is incident on a mirror 510 and is reflected from the mirror, the polarization state of the reference light is converted to s-polarization from circular polarization by the λ/4 plate 509, and the reference light is incident on the polarizing beam splitter 504. The signal light and the reference light are combined by the polarizing beam splitter 504, and combination light is generated. The combination light is guided to an interference optical system 511 that includes a half beam splitter 512, a λ/2 plate 513, a λ/4 plate 514, condenser lenses 515 and 516, and Wallaston prisms 517 and 518. The combination light incident on the interference optical system 511 is branched into two, that is, transmission light and reflection light by the half beam splitter 512. The transmission light is transmitted through the λ/2 plate 513 whose optical axis is set to approximately 22.5 degrees with respect to the horizontal direction, is condensed by the condenser lens 515, and is separated into polarized light beams by the Wallaston prism 517. Thus, a first interfering light beam and a second interfering light beam which have a different phase relationship of 180 degrees are generated. The first interfering light beam and the second interfering light beam are detected by a current differential photodetector 519, and a differential output signal 521 in proportion to an intensity difference between these interfering light beams is output. Meanwhile, the reflection light is transmitted through the λ/4 plate 514 whose optical axis is set to approximately 45 degrees with respect to the horizontal direction, is condensed by the condenser lens 516, and is separated into polarized light beams by the Wallaston prism 518. Thus, a third interfering light beam and a fourth interfering light beam which have a phase relationship of approximately 180 degrees are generated. Here, the third interfering light beam has a phase difference of approximately 90 degrees from that of the first interfering light beam. The third interfering light beam and the fourth interfering light beam are detected by a current differential photodetector 520, and a differential output signal 522 in proportion to an intensity difference between these interfering light beams is output. The generated differential output signals 521 and 522 (hereinafter, referred to as I(z) and Q(z)) are input to a signal processing unit 523, and an arithmetic operation is performed on these signals. A tomographic image of the measurement target formed based on an imaging signal 524 is displayed on an image display unit 525.

Next, an operation principle of the interference optical system 511 will be described using Expressions. A Jones vector of the combination light when the combination light is incident on the interference optical system 511 is represented as follows.

$$\begin{pmatrix} E_{sig} \\ E_{ref} \end{pmatrix} \quad (1)$$

where $E_{sig}$ indicates a complex electric field amplitude of the signal light reflected from the measurement target, and $E_{ref}$ indicates a complex amplitude of the reference light. The $E_{sig}$ can be represented as follows by using a position z in an optical axis direction where the signal light is condensed, an optical axis direction position $z_j$ of a j-th reflection surface when counted from a surface of the measurement target, and a complex electric field amplitude $A_j$ of a reflection light from the j-th reflection surface.

$$E_{sig} = \sum_j |A_j| \exp[i(W(z-z_j)r^2 + 2kz_j)] \quad (2)$$

$W(z-z_j)r^2$ indicates a defocus aberration, W is given by $W=2\pi*NA^2*z/(\lambda*d^2)$. r indicates a distance from an optical axis center, d indicates a radius of a lens aperture, and k indicates a wave number of laser light. A Jones vector of the combination light which has been transmitted through the half beam splitter 512 and has been transmitted through the λ/2 plate 513 is represented as follows.

$$\begin{pmatrix} 1/\sqrt{2} & -1/\sqrt{2} \\ 1/\sqrt{2} & 1/\sqrt{2} \end{pmatrix} \begin{pmatrix} E_{sig}/\sqrt{2} \\ E_{ref}/\sqrt{2} \end{pmatrix} = \frac{1}{2}\begin{pmatrix} E_{sig} - E_{ref} \\ E_{sig} + E_{ref} \end{pmatrix} \quad (3)$$

Since the combination light represented as Expression 3 by the Wallaston prism 517 is separated into a p-polarization component and a s-polarization component and the differential output signal is detected by the current differential photodetector 519, I(z) is represented as follows.

$$I(z) = \int_D \left[\frac{1}{4}|E_{sig} + E_{ref}|^2 - \frac{1}{4}|E_{sig} - E_{ref}|^2\right]d\rho \quad (4)$$

where $\rho=(x, y)$ indicates a coordinate vector of a luminous flux cross section, D indicates a detection region, and $\int_D d\rho$ indicates an integral operation in the entire region in luminous flux. For the sake of simple calculation, it is assumed that conversion efficiency of the photodetector is 1.

Meanwhile, a Jones vector of the combination light which has been reflected by the half beam splitter 512 and has been transmitted through the $\lambda/4$ plate 514 is represented as follows.

$$\begin{pmatrix} i/\sqrt{2} & 1/\sqrt{2} \\ 1/\sqrt{2} & i/\sqrt{2} \end{pmatrix}\begin{pmatrix} E_{sig}/\sqrt{2} \\ E_{ref}/\sqrt{2} \end{pmatrix} = \frac{1}{2}\begin{pmatrix} i(E_{sig} - iE_{ref}) \\ E_{sig} + iE_{ref} \end{pmatrix} \quad (5)$$

Since the combination light represented as Expression 5 by the Wallaston prism 518 is separated into a p-polarization component and a s-polarization component and the differential output signal is detected by the current differential photodetector 520, Q(z) is represented as follows.

$$Q(z) = \int_D \left[\frac{1}{4}|E_{sig} + iE_{ref}|^2 - \frac{1}{4}|E_{sig} - iE_{ref}|^2\right]d\rho \quad (6)$$

The following expressions are obtained by substituting Expression 2 in Expressions 4 and 6 to perform an integral operation.

$$I(z) = \sum_j |E_{ref}||A_j|\frac{\sin(k_{eff}(z-z_i))}{k_{eff}(z-z_i)}\cos(k_{eff}(z-z_i) + 2k(z_i - z_{ref})) \quad (7)$$

$$Q(z) = \sum_j |E_{ref}||A_j|\frac{\sin(k_{eff}(z-z_i))}{k_{eff}(z-z_i)}\sin(k_{eff}(z-z_i) + 2k(z_i - z_{ref})) \quad (8)$$

where $Z_{ref}$ is an optical axis direction position of the mirror 510, and $k_{eff}=\pi*NA^2/\lambda$.

I(z) and Q(z) represented as Expression 7 and Expression 8 are input to the signal processing unit 523, and reflection light components from a certain portion are subtracted from the signals according to a procedure shown in FIG. 6. Thereafter, a sum-of-squares operation is performed on the signals. A signal processing method when surface reflection light components are subtracted will be described below. The surface reflection signal components $I_0$ and $Q_0$ which are included in I(z) and Q(z) are items when j=0 in Expression 7 and Expression 8, and are represented as the following expressions.

$$I_0(z) = |E_{ref}||A_0|\frac{\sin(k_{eff}(z-z_0))}{k_{eff}(z-z_0)}\cos(k_{eff}(z-z_0) + 2k(z_0 - z_{ref})) \quad (9)$$

$$Q_0(z) = |E_{ref}||A_0|\frac{\sin(k_{eff}(z-z_0))}{k_{eff}(z-z_0)}\cos(k_{eff}(z-z_0) + 2k(z_0 - z_{ref})) \quad (10)$$

In order to express the surface reflection signal components represented by Expression 9 and Expression 10 by using the detection signals, the following relational expressions are used.

$$I(z_0) = |E_{ref}||A_0|\cos(2k(z_0 - z_{ref})) + \quad (11)$$
$$\sum_j |E_{ref}||A_j|\frac{\sin(k_{eff}(z_0 - z_i))}{k_{eff}(z_0 - z_i)}\cos(k_{eff}(z_0 - z_i) + $$
$$2k(z_i - z_{ref})) \approx |E_{ref}||A_0|\cos(2k(z_0 - z_{ref}))$$

$$Q(z_0) = |E_{ref}||A_0|\sin(2k(z_0 - z_{ref})) + \quad (12)$$
$$\sum_j |E_{ref}||A_j|\frac{\sin(k_{eff}(z-z_0))}{k_{eff}(z-z_0)}\sin(k_{eff}(z-z_0) + 2k(z_i - z_{ref})) \approx$$
$$|E_{ref}||A_0|\sin(2k(z_0 - z_{ref}))$$

$$\arctan\left(\frac{Q(z_0)}{I(z_0)}\right) \approx 2k(z_0 - z_{ref}) \quad (13)$$

$$\sqrt{\{I(z_0)\}^2 + \{Q(z_0)\}^2} \approx |E_{ref}||A_0| \quad (14)$$

Here, in Expression 11 to Expression 14, when j>0, the following expression is obtained, and an approximation is applied.

$$|A_0| \gg |A_j|\frac{\sin(k_{eff}(z-z_i))}{k_{eff}(z-z_i)} \quad (39)$$

When Expression 13 and Expression 14 are substituted in Expression 9 and Expression 10, the following expressions are obtained.

$$I_0(z) \approx \sqrt{\{I(z_0)\}^2 + \{Q(z_0)\}^2} \quad (15)$$
$$\frac{\sin(k_{eff}(z-z_0))}{k_{eff}(z-z_0)}\cos\left(k_{eff}(z-z_0) + \arctan\left(\frac{Q(z_0)}{I(z_0)}\right)\right)$$

$$Q_0(z) \approx \sqrt{\{I(z_0)\}^2 + \{Q(z_0)\}^2} \quad (16)$$
$$\frac{\sin(k_{eff}(z-z_0))}{k_{eff}(z-z_0)}\sin\left(k_{eff}(z-z_0) + \arctan\left(\frac{Q(z_0)}{I(z_0)}\right)\right)$$

As mentioned above, in the present invention, it is possible to approximately calculate the surface reflection light components included in the detection signals from the differential output signal values $I(z_0)$ and $Q(z_0)$ in the surface positions and an already known parameter $k_{eff}$. In the signal processing unit 523, the surface reflection light components represented as Expression 15 and Expression 16 are subtracted from the detection signals, and the sum-of-squares operation is performed to obtain an imaging signal sig(z).

$$\text{sig}(z) = [I(z) - I_0(z)]^2 + [Q(z) - Q_0(z)]^2 \quad (17)$$

Figure 1:
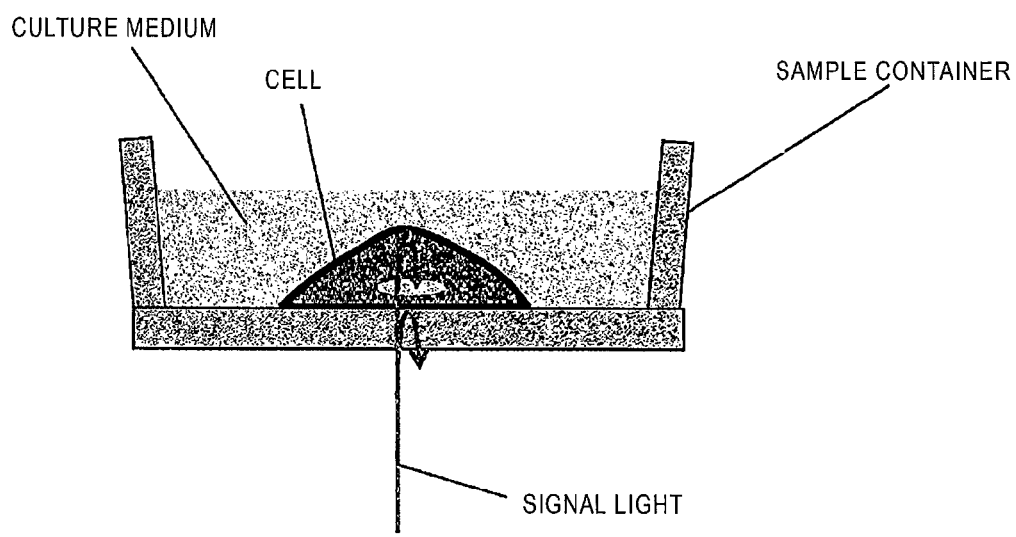
FIG. 1 is a schematic diagram illustrating an example of a measurement target of an OCT apparatus.
Figure 2:
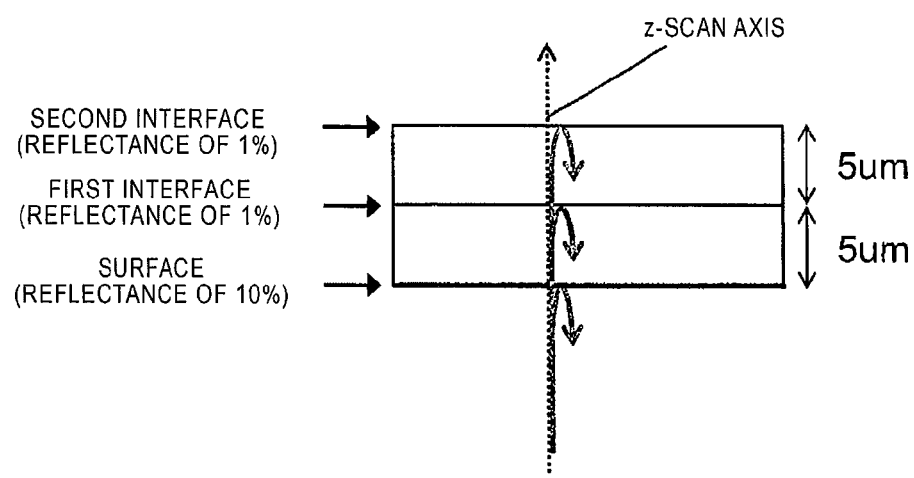
FIG. 2 is a schematic diagram illustrating an example of a measurement target of the OCT apparatus.
Figure 3:
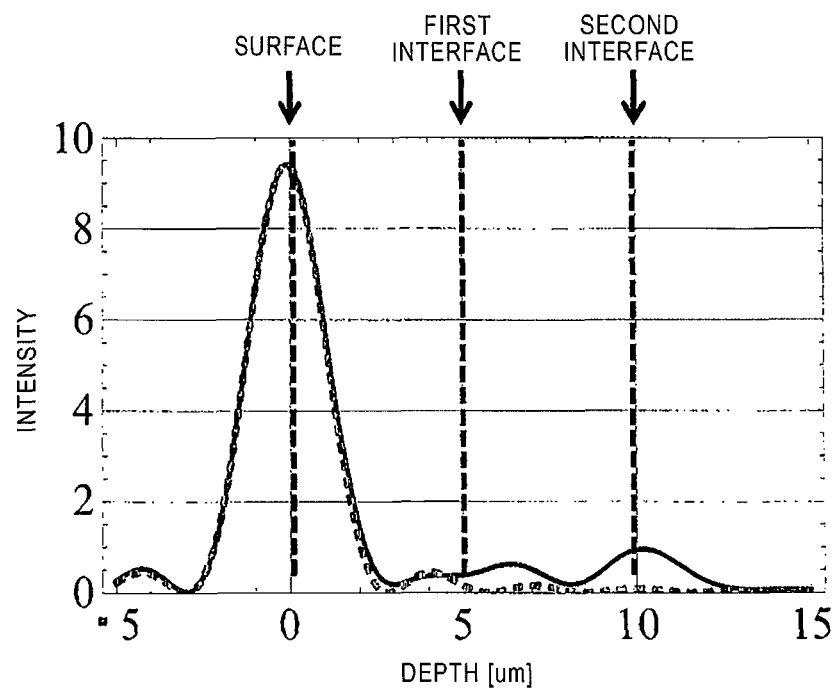
FIG. 3 is a schematic diagram illustrating an example of a signal detected by an OCT apparatus of the related art.
Figure 4:
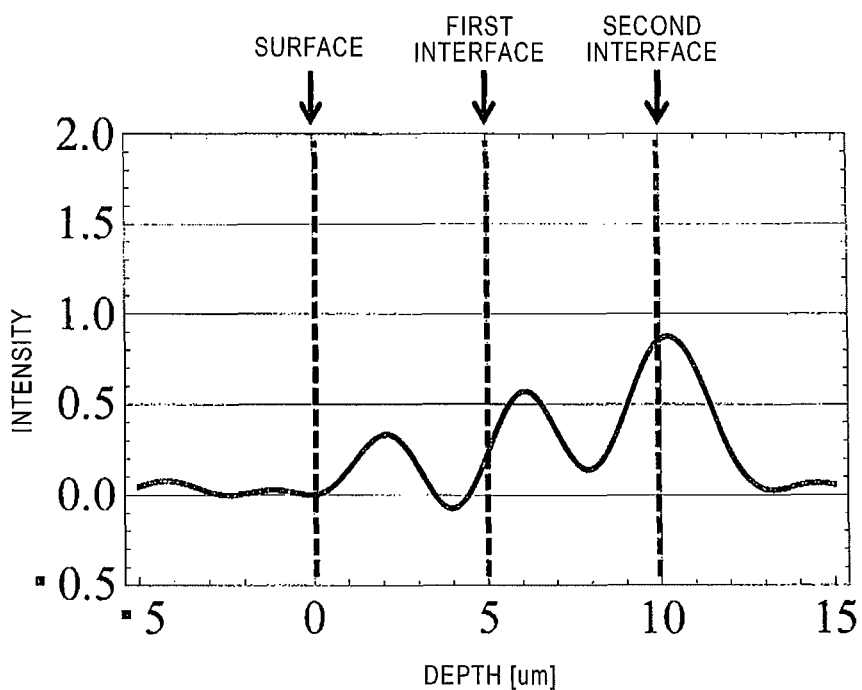
FIG. 4 is a schematic diagram illustrating an example of a signal detected by the OCT apparatus of the related art.
Figure 7:
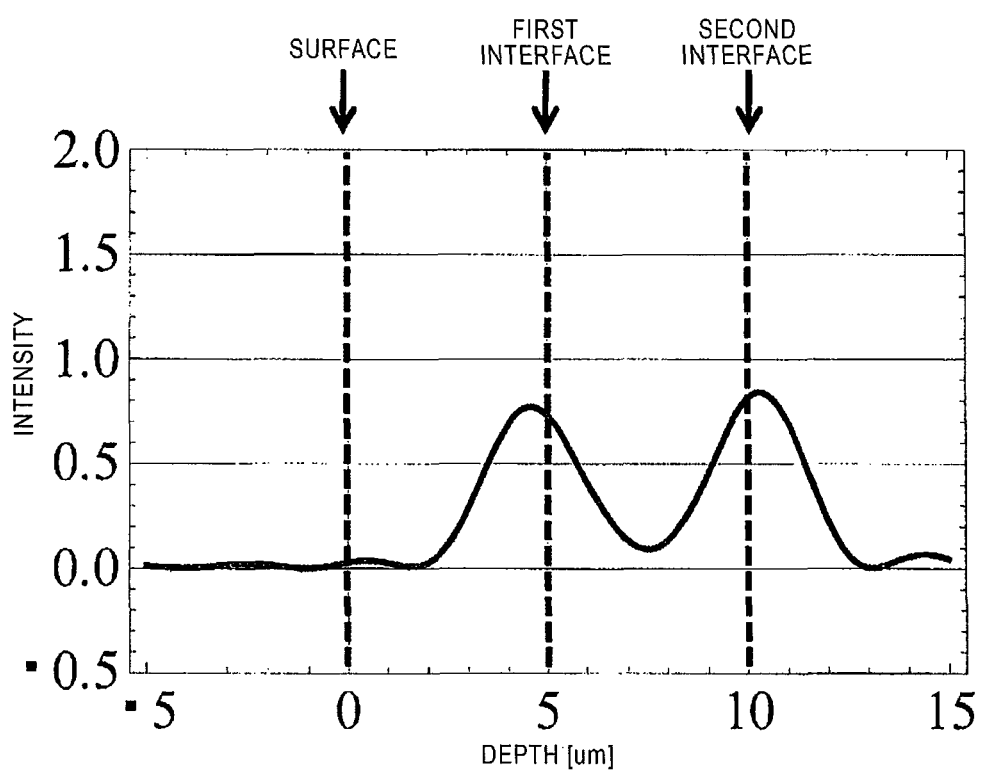
FIG. 7 is a schematic diagram illustrating an example of a signal detected by an OCT apparatus of the present invention.

FIG. 7 is a diagram showing a case where the imaging signal sig(z) is obtained along a z scan axis shown in FIG. 2 by using the optical measurement apparatus of the present embodiment. Unlike the waveforms shown in FIGS. 3 and 4, it is possible to exactly recognize a peak corresponding to a first interface. A peak does not appear in a position where there is no interface, and a peak position is not shifted.

That is, in the present embodiment, the plurality of interfering light beams are generated and detected, and the surface reflection light components are subtracted from the differential output signals. Thus, it is possible to suppress the influence of the surface reflection signal in consideration of the light interference effect. Accordingly, the structure near the surface of the measurement target can be vividly visualized as compared to the OCT apparatus of the related art.

Next, spatial resolution of the optical measurement apparatus of the present invention will be described. Here, spatial resolution in the optical axis direction is defined as full width at half maximum of a peak of an imaging signal corresponding to a single reflection surface obtained when the objective lens is scanned in the optical axis direction. A signal corresponding to Expression 17 when there is only the single reflection surface is represented by the following expression.

$$sig(z) = |E_{ref}|^2 |A_1|^2 sinc^2\left(\pi \cdot \frac{(z-z_0)}{\lambda} NA^2\right) \quad (18)$$

From the expression above, the full width at half maximum of the signal from the single reflection surface, that is, the spatial resolution in the optical axis direction is approximately represented as follows.

$$0.886 \frac{\lambda}{NA^2} \quad (19)$$

Here, $\lambda$ is a wavelength of the laser beam, and NA is a numerical aperture of the objective lens 506. In general, the wavelength of the light used in the OCT apparatus ranges from approximately 600 nm to 1300 nm which is hardly absorbed by both of hemoglobin and water. For example, when the numerical aperture of the objective lens is set to 0.4 or more, the spatial resolution in the optical axis direction in a wavelength of 600 nm to 1300 nm is approximately 3.3 um to 7.2 um, and, thus, it is possible to achieve resolution in the optical axis direction which is equal to or higher than that in the OCT apparatus of the related art.

In the present embodiment, four interfering light beams whose phases are different from one another by 90 degrees are generated and detected in the interference optical system 511, but the number of interfering light beams is not particularly limited as long as the number of interfering light beams is three or more. Thus, it is possible to obtain the same effect as that in the present embodiment. For example, by generating three interfering light beams whose phases are different from one another by 60 degrees and detecting the generated interfering light beams, it is possible to obtain the same signal at that represented as Expression 17.

For the sake of convenience in description, the function of the present invention has been described so far that the signal light has only the defocus aberration and the reference light has no aberration. Even when these conditions are not satisfied, by measuring a reference sample to learn a behavior of the detection signal, it is possible to provide the same effect. In the following description, a method thereof will be described.

Even under the condition where there is an aberration in addition to the defocus, $I(z_0)$ and $Q(z_0)$ can be represented as follows by superposing the reflection light components from the plurality of reflection surfaces.

$$I(z) = \sum_j B_j h_I(z-z_j, \phi_j) \quad (20)$$

$$Q(z) = \sum_j B_j h_Q(z-z_j, \phi_j) \quad (21)$$

where $B_j$ is a constant representing intensity of j-th reflection light, and $\phi_j$ is a phase difference between the j-th reflection light and the j-th reference light. $h_I$ and $h_Q$ are point spread functions representing the response from the single reflection surface, and when there is no aberration except for the defocus, the following expressions are obtained.

$$h_I(z, \phi) = \frac{\sin(k_{eff}z)}{k_{eff}z} \cos(k_{eff}z + \phi) \quad (22)$$

$$h_Q(z, \phi) = \frac{\sin(k_{eff}z)}{k_{eff}z} \sin(k_{eff}z + \phi) \quad (23)$$

When there is an aberration in addition to the defocus, it is difficult to represent the point spread functions $h_I$ and $h_Q$ by simple expressions such as Expression 22 and Expression 23. In the present invention, the behaviors of the point spread functions $h_I$ and $h_Q$ when there is an aberration are learned by measuring the reference sample. As the reference sample, the reflection surface of the mirror or the surface of the cover glass are considered. Specifically, the point spread functions are learned by recording, in the signal processing unit, detection signal wavelengths obtained through the scanning of the objective lens in the z direction for every phase difference $\phi$. The phase difference $\phi$ can be adjusted by moving a position of the mirror 510 using a piezoelectric element to change an optical path length of the reference light. When the point spread functions $h_I$ and $h_Q$ obtained in this manner are used, the surface reflection light components can be represented as follows by using the differential output signal values $I(z_0)$ and $Q(z_0)$ in the surface reflection position $z_0$.

$$I_0(z) \approx \sqrt{\{I(z_0)\}^2 + \{Q(z_0)\}^2} \; h_I\left(z-z_0, \arctan\left(\frac{Q(z_0)}{I(z_0)}\right)\right). \quad (24)$$

$$Q_0(z) \approx \sqrt{\{I(z_0)\}^2 + \{Q(z_0)\}^2} \; h_Q\left(z-z_0, \arctan\left(\frac{Q(z_0)}{I(z_0)}\right)\right) \quad (25)$$

By subtracting the surface reflection signal components from I(z) and Q(z), even when there is an aberration, it is possible to suppress the influence of the surface reflection signal in consideration of the light interference effect, and it is possible to vividly visualize a structure near the surface of the measurement target as compared to the OCT apparatus of the related art.

In the present invention, although the surface reflection signal components are subtracted from the differential output signals I(z) and Q(z) by using the current differential photodetector, the surface reflection signal components are not necessarily subtracted from the differential output signals. For example, when four detection signals are obtained using a typical (non-differential) photodetector and the surface reflection signals are subtracted from the four detection signals, it is possible to also obtain the same effect.

Embodiment 2

Figure 8:
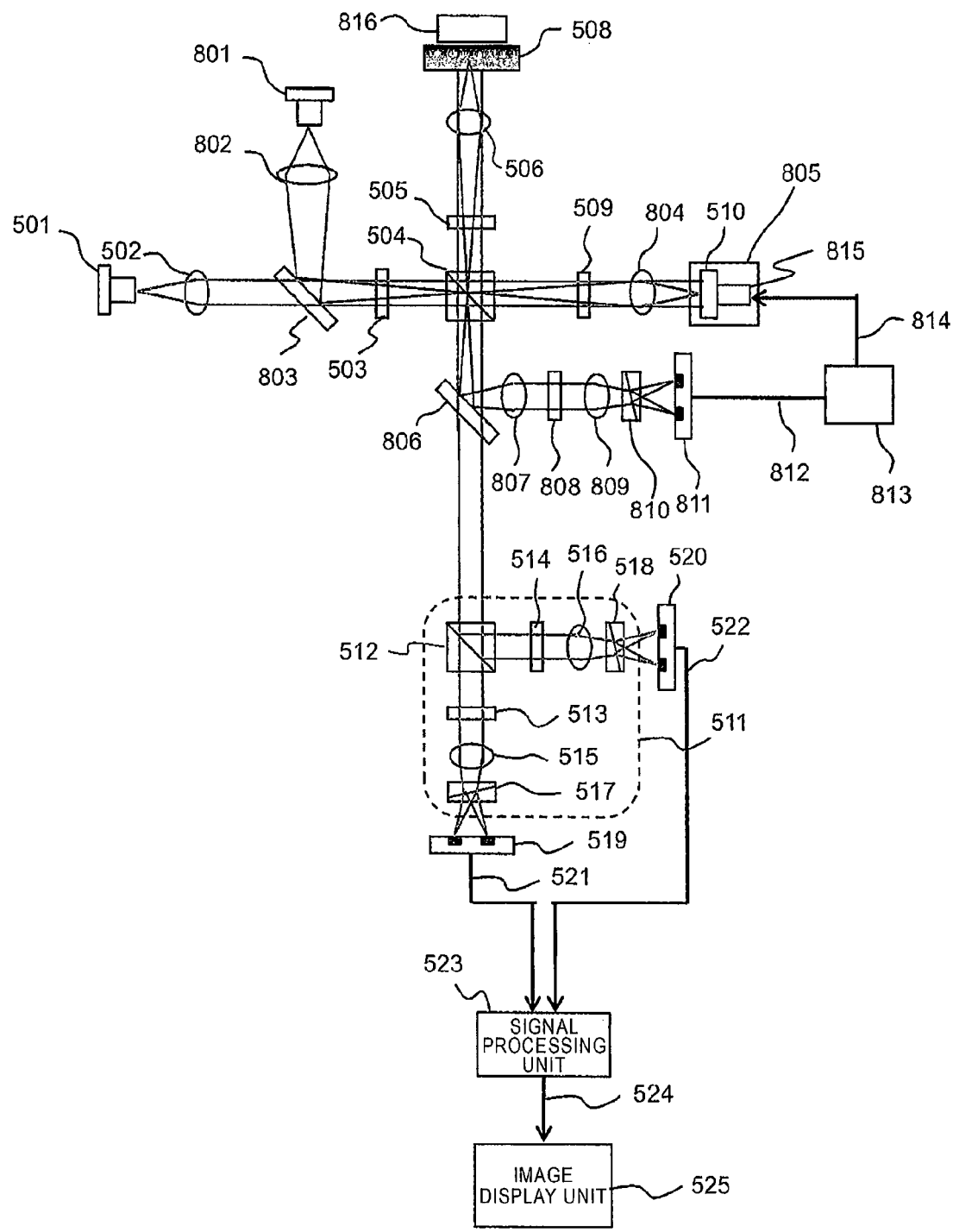
FIG. 8 is a schematic diagram illustrating an example of the configuration of the optical measurement apparatus of the present invention.

FIG. 8 is a schematic diagram illustrating another embodiment of the optical measurement apparatus according to the present invention. The same components as those shown in FIG. 5 are assigned by the same reference numerals, and the redundant description thereof will not be presented. The present embodiment further includes a mechanism that suppresses a phase difference variation between signal light and reference light due to a disturbance in addition to the configuration of the first embodiment. Low coherent light which is emitted from a low coherence light source 801 and has a wavelength different from the laser beam from the light source 501 is transmitted through a lens 802, is reflected by a dichroic mirror 803 which transmits the laser beam from the light source 501 and reflects the low coherent light from the light source 801, and is coaxially superposed on the laser beam emitted from the light source 501. Thereafter, polarization of the low coherent light is rotated by the λ/2 plate 503 capable of adjusting the optical axis direction, and the low coherent light is branched into two, that is, second signal light and second reference light by the polarizing beam splitter 504. The second signal light is transmitted through the λ/4 plate 505 whose optical axis direction is set to approximately 22.5 degrees with respect to the horizontal direction, and a polarization state of the second signal light is converted from s-polarization to circular polarization. Subsequently, the second signal light is transmitted through the objective lens 506 having the numerical aperture of 0.4 or more to apply the measurement target 508. In this case, the lens 802 is adjusted such that the second signal light immediately after being transmitted through the objective lens. 506 almost becomes collimated light. The second signal light reflected or scattered from the measurement target is transmitted through the objective lens 506 again, and a polarization state of the second signal light is converted from circular polarization to p-polarization by the λ/4 plate 505, and the second signal light is incident on the polarizing beam splitter 504. Meanwhile, the second reference light is transmitted through the λ/4 plate 509, and a polarization state is converted from p-polarization to circular polarization. Thereafter, the second reference light is transmitted through a lens 804, and is incident on a mirror 510 attached to a piezoelectric element 815. In this case, the lens 802 is adjusted such that the second reference light immediately after being transmitted through the lens 804 almost becomes collimated light. An optical axis direction position of the mirror 510 is adjusted by a movable stage 805 such that an optical path length of reflection light which is included in the second signal light and is reflected from the surface of the measurement target is substantially equal to an optical path length of the second reference light. A polarization state of the second reference light reflected by the mirror 510 is converted circular polarization to s-polarization by the λ/4 plate 509, and the second reference light is incident on the polarizing beam splitter 504. The second signal light and the second reference light are combined by the polarizing beam splitter 504, and second combination light is generated. The second combination light is reflected by a dichroic mirror 806 which transmits the laser beam from the light source 501 and reflects the low coherent light from the light source 801, and is converted into collimated light by a collimating lens 807. Thereafter, polarization of the combination light is rotated by 45 degrees by a λ/4 plate 808 whose optical axis is set to approximately 45 degrees with respect to the horizontal direction, and the combination light is separated into polarized light beams by a Wallaston prism 810 while being condensed by a condenser lens 809. Thus, two interfering light beams having a different phase relationship of 180 degrees are generated. The interfering light beams are detected by a current differential photodetector 811, and a differential output signal 812 in proportion to an intensity difference between these low coherent beams is output. The differential output signal 812 is input to a phase control unit 813, and the phase control unit 813 drives the piezoelectric element 815 on the basis of the signal 812. An optical path of the laser beam emitted from the light source 501 is the same as that of the first embodiment, and is different from the first embodiment in that scanning of a condensing position of the signal light is performed by scanning a measurement target position by a movable sample stage 816 other than the objective lens actuator.

As mentioned above, since the optical path length of the second reference light is adjusted to be substantially equal to the optical path length of the reflection light which is included in the second signal light and is reflected from the surface of the measurement target, when it is considered that only the reflection light component which is included in the second signal light and is reflected from the surface of the measurement target selectively interferes with the second reference light, the differential output signal 812 is approximately represented as follows.

$$FB=|E_{sig2}||E_{ref2}|\sin(2k'(z_0-z_{ref})) \quad (26)$$

where $E_{sig2}$ and $E_{ref2}$ are complex electric field amplitudes of the second signal light and the second reference light when the second signal light and the second reference light are combined by the polarizing beam splitter 504, and k' is a wave number of the low coherent light. The phase control unit 813 controls the piezoelectric element 815 such that a value of the differential output signal 812 given by Expression 26 is constantly equal to approximately zero (so as to satisfy $Z_0-Z_{ref}=0$). An optical path from a point where the reflection signal is branched into the second signal light and the second reference light to a point where the second signal light and the second reference light are combined is the same as an optical path from a point where the laser beam generated from the laser beam emitted from the light source 501 is branched into the signal light and the reference light (hereinafter, referred to as first signal light and first reference light) to a point where the first signal light and the first reference light are combined. Thus, even when the position of the measurement target is varied due to the disturbance by the aforementioned control, a difference in the optical path length between the first signal light and the first reference light is maintained to be substantially constant. Accordingly, since a value of Expression 13 is hardly varied while the condensing position is scanned in the optical axis direction, it is possible to precisely perform the subtraction of the surface reflection light according to the procedure shown in FIG. 6, and it is possible to obtain a vivider image.

Embodiment 3

Figure 9:
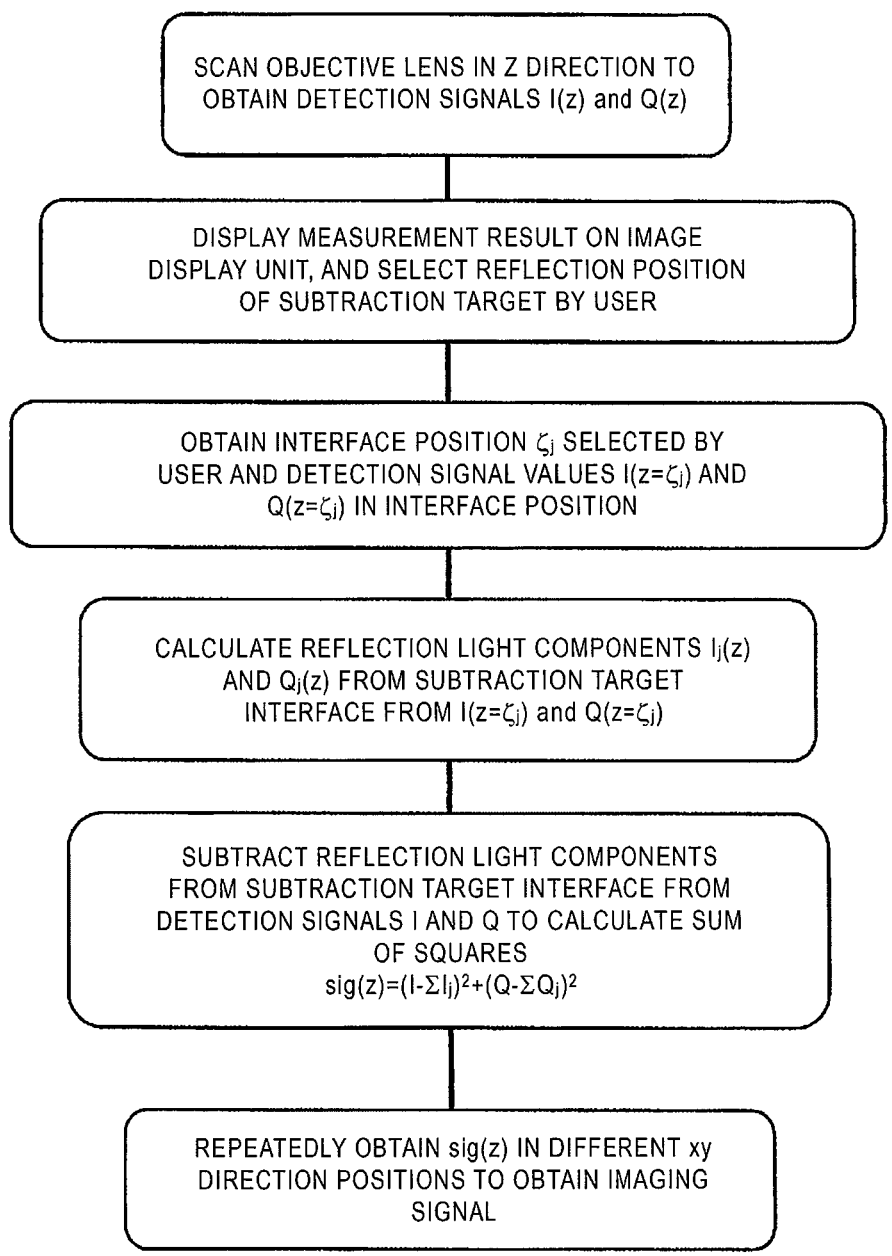
FIG. 9 is a schematic diagram illustrating another embodiment of the signal processing method in the optical measurement apparatus of the present invention.
Figure 10:
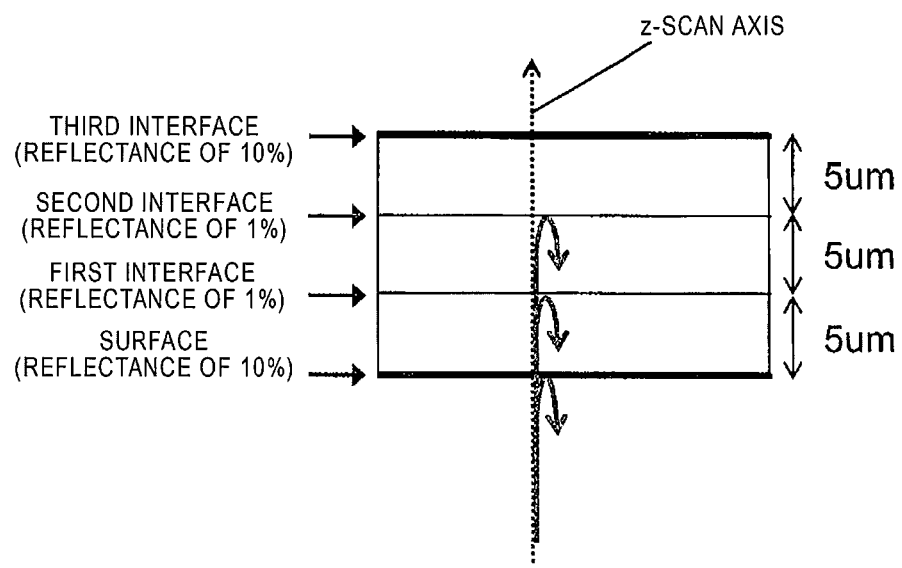
FIG. 10 is a schematic diagram illustrating another example of a measurement target of the OCT apparatus.

FIG. 9 is a diagram showing another embodiment of the signal processing method in the optical measurement apparatus according to the present invention. The present embodiment is different from the first embodiment in that a plurality of reflection light components is subtracted. Except for the signal processing method, a configuration in the present embodiment is the same as that in the first embodiment shown in FIG. 5, and, thus, the redundant description thereof will not be presented. Hereinafter, case where a structure having four interfaces shown in FIG. 10 is measured using the optical measurement apparatus of the present embodiment will be described with reference to FIG. 9.

Firstly, the objective lens is scanned in the z direction to obtain the differential output signals 521 and 522 (hereinafter, referred to as I(z) and Q(z)), and sum-of-squares signals thereof are displayed on the image display unit 525.

Figure 11:
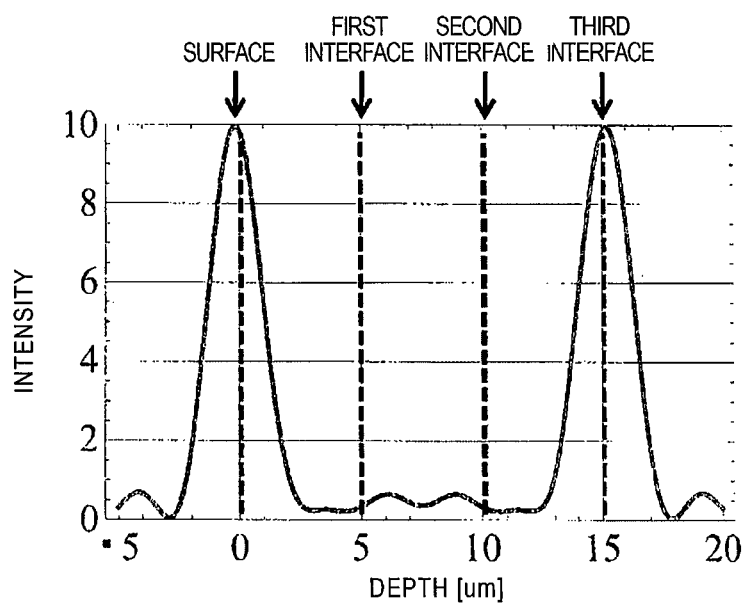
FIG. 11 is a schematic diagram illustrating another example of the signal detected by the OCT apparatus of the present invention.

A user selects a portion where intensive reflection that may adversely influence on the measurement result occurs based on the displayed measurement result. Examples of such a portion include a front surface or a rear surface of a cover glass when a sample disposed on the cover glass is measured, a front surface and a rear surface of a container when a sample disposed within the container filled with any solution, and a liquid surface of the solution. FIG. 11 shows the sum-of-squares signals of I(z) and Q(z) obtained when the structure of FIG. 10 is measured. Due to an intensive reflection influence from interfaces existing in positions of 0 um and 15 um, it is difficult to recognize presence of the interfaces existing in the positions of 5 um and 10 um. A case where reflection light components from the interface (front surface) existing in the position of 0 um and the interface (third interface) existing in the position of 15 um are subtracted will be described below.

The signal processing unit 523 obtains an interface position $\zeta_j$ of a subtraction target selected by the user and detection signal values $I(\zeta_j)$ and $Q(\zeta_j)$ in the subtraction position, and calculates reflection light components from the subtraction target interfaces represented as the following expressions.

$$I_j(z) \approx \sqrt{\{I(\zeta_j)\}^2 + \{Q(\zeta_j)\}^2} \frac{\sin(k_{eff}(z-\zeta_j))}{k_{eff}(z-\zeta_j)} \cos\left(k_{eff}(z-\zeta_j) + \arctan\left(\frac{Q(\zeta_j)}{I(\zeta_j)}\right)\right) \quad (27)$$

$$Q_j(z) \approx \sqrt{\{I(\zeta_j)\}^2 + \{Q(\zeta_j)\}^2} \frac{\sin(k_{eff}(z-\zeta_j))}{k_{eff}(z-\zeta_j)} \sin\left(k_{eff}(z-\zeta_j) + \arctan\left(\frac{Q(\zeta_j)}{I(\zeta_j)}\right)\right) \quad (28)$$

The reflection light components from the subtraction target interfaces are subtracted from I(z) and Q(z), and the sum-of-squares operation is performed to obtain an imaging signal sig(z).

$$sig(z) = \left[I(z) - \sum_j I_j(z)\right]^2 + \left[Q(z) - \sum_j Q_j(z)\right]^2 \quad (29)$$

Figure 12:
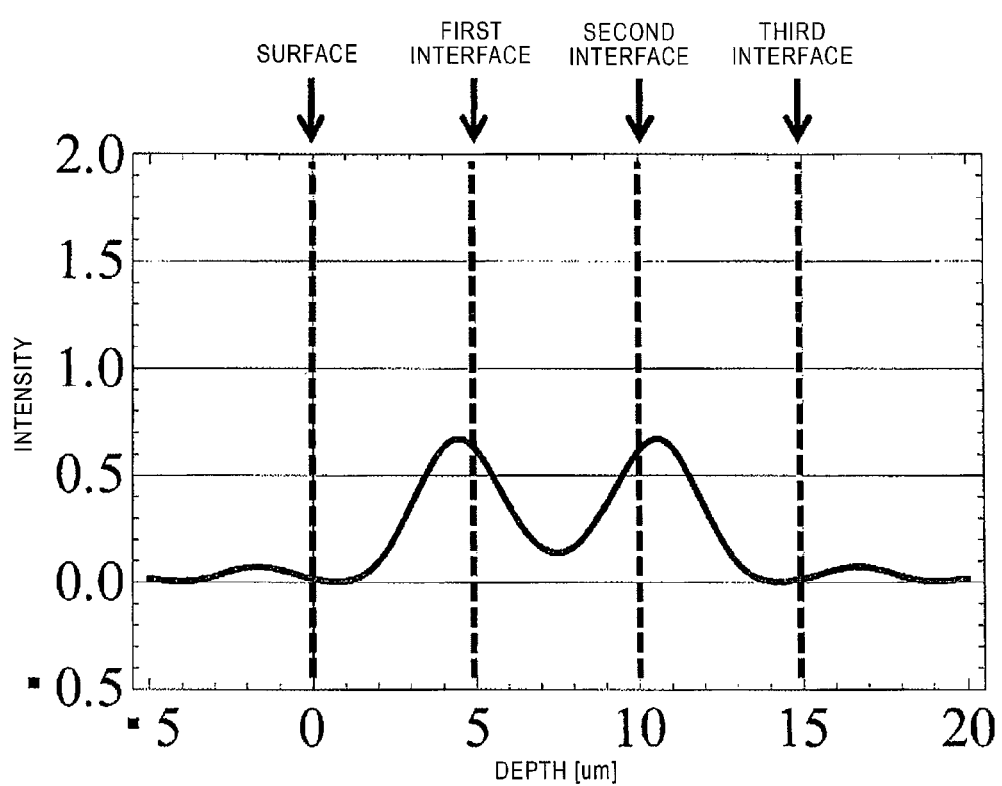
FIG. 12 is a schematic diagram illustrating still another example of the signal detected by the OCT apparatus of the present invention.

FIG. 12 shows the imaging signal sig(z) obtained by subtracting the reflection light components from the surface and the third interface from I(z) and Q(z) and performing the sum-of-squares operation. Unlike the result shown in FIG. 11, it is possible to clearly recognize the presence of the first interface and the second interface.

In the present embodiment, even when there is a plurality of portions where intense reflection light is generated, since the reflection light components from the plurality of interfaces are subtracted, it is possible to suppress the influence of the reflection light components in consideration of the light interference effect, so that it is possible to vividly visualize the structure near the portion where the intensive reflection of the measurement target occurs as compared to the OCT apparatus of the related art.

Embodiment 4

Figure 13:
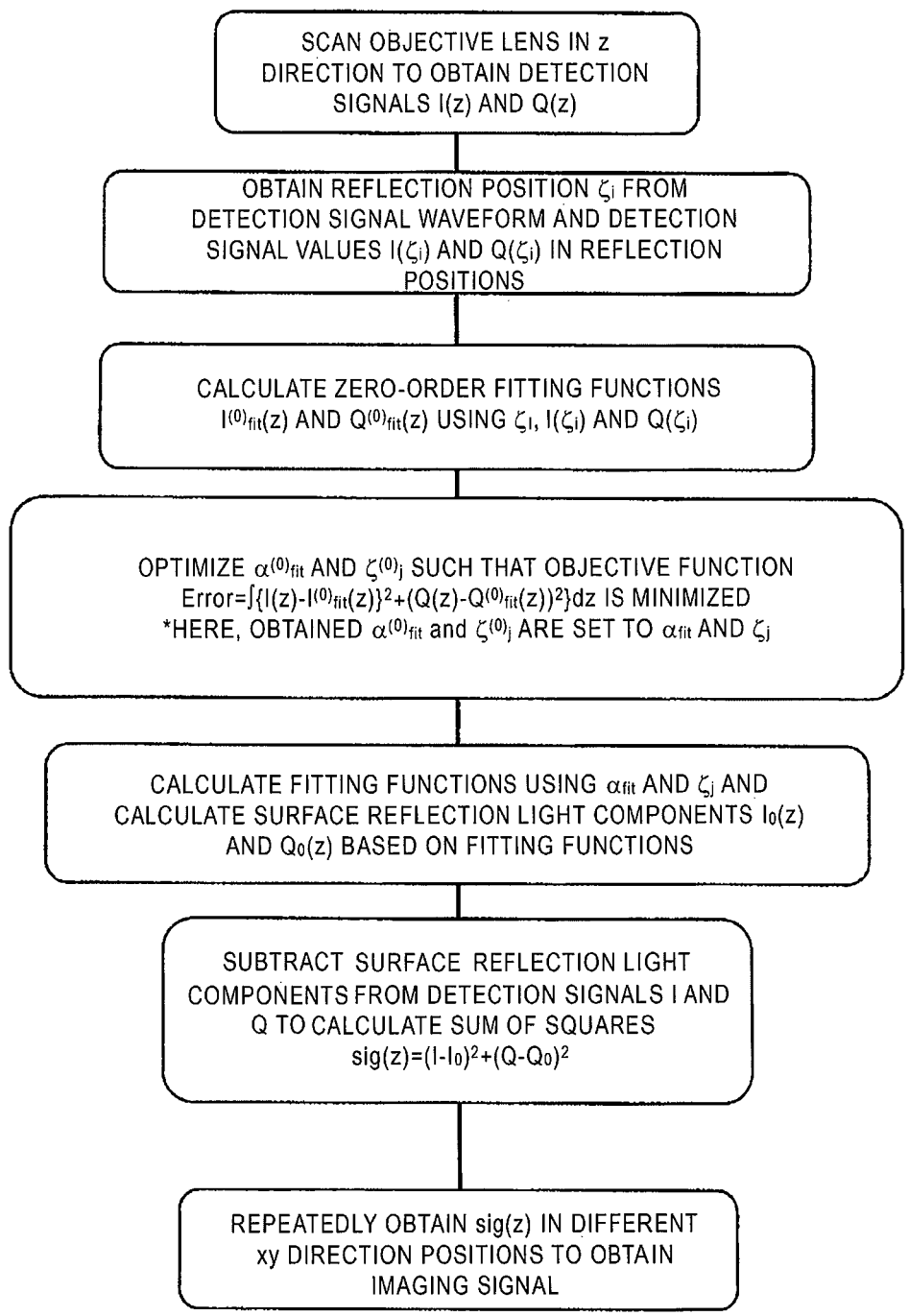
FIG. 13 is a schematic diagram showing still another embodiment of the signal processing method in the optical measurement apparatus of the present invention.

FIG. 13 is a diagram showing still another embodiment of the signal processing method in, the optical measurement apparatus according to the present invention. The present embodiment is different from the first embodiment in that the present embodiment includes a process of optimizing the surface reflection light components to be subtracted. Except for the signal processing method, a configuration in the present embodiment is the same as that of FIG. 5, and, thus, the redundant description thereof will not be presented. A case where the structure shown in FIG. 2 is measured using the optical measurement apparatus of the present embodiment will be described below with reference to FIG. 13.

Firstly, the objective lens is scanned in the direction to obtain the differential output signals 521 and 522 (hereinafter, referred to as I(z) and Q(z)), and an estimated reflection position from waveforms of the sum-of-squares signals thereof and detection signal values $I(\zeta_j)$ and $Q(\zeta_j)$ in the reflection position are obtained. Here, the estimated reflection position refers to a position where it is estimated that the reflection occurs, and does not necessarily coincide with a position where the reflection actually occurs. The estimated reflection position is obtained by, for example, extracting a maximum point which is present inside rather than the surface reflection position and has a value equal to or greater than a certain threshold.

Subsequently, the signal processing unit 523 calculates zero-order fitting functions for I(z) and Q(z) which are represented as the following expressions by using the $\zeta_i$, $I(\zeta_i)$ and $Q(\zeta_i)$.

$$I_{fit}^{(0)}(z) = \sum_j \alpha_j^{(0)} \frac{\sin(k_{eff}(z-\zeta_j^{(0)}))}{k_{eff}(z-\zeta_j^{(0)})} \cos\left(\begin{array}{c} k_{eff}(z-\zeta_j^{(0)}) + 2k(\zeta_j^{(0)} - \zeta_0^{(0)}) + \\ \arctan\left(\frac{Q(\zeta_0^{(0)})}{I(\zeta_0^{(0)})}\right) \end{array}\right) \quad (30)$$

$$Q_{fit}^{(0)}(z) = \sum_j \alpha_j^{(0)} \frac{\sin(k_{eff}(z-\zeta_j^{(0)}))}{k_{eff}(z-\zeta_j^{(0)})} \sin\left(\begin{array}{c} k_{eff}(z-\zeta_j^{(0)}) + 2k(\zeta_j^{(0)} - \zeta_0^{(0)}) + \\ \arctan\left(\frac{Q(\zeta_0^{(0)})}{I(\zeta_0^{(0)})}\right) \end{array}\right) \quad (31)$$

Here, the following expression is obtained.
Expression 32

$$\alpha_j^{(0)} = \sqrt{\{I(\zeta_j^{(0)})\}^2 + \{Q(\zeta_j^{(0)})\}^2} \quad (32)$$

In general, since the zero-order fitting functions do not coincide with I(z) and Q(z), the signal processing unit 523 optimizes $\alpha_j^{(0)}$ and $\zeta_j^{(0)}$ in the zero-order fitting functions such that the following objective functions are minimized.
Expression 33

$$\text{Error} = \int [\{I(z) - I_{fit}^{(0)}(z)\}^2 + \{Q(z) - Q_{fit}^{(0)}(z)\}^2]_{dz} \quad (33)$$

If $\alpha_j^{(0)}$ and $\zeta_j^{(0)}$ when Expression 33 is minimized is set to $\alpha_j$ and $\zeta_j$, the optimized fitting functions are represented as follows.

$$I_{fit}(z) = \sum_j \alpha_j \frac{\sin(k_{eff}(z-\zeta_j))}{k_{eff}(z-\zeta_j)} \cos\left(k_{eff}(z-\zeta_j) + 2k(\zeta_j - \zeta_0) + \arctan\left(\frac{Q(\zeta_0)}{I(\zeta_0)}\right)\right) \quad (34)$$

$$Q_{fit}(z) = \sum_j \alpha_j \frac{\sin(k_{eff}(z-\zeta_j))}{k_{eff}(z-\zeta_j)} \sin\left(k_{eff}(z-\zeta_j) + 2k(\zeta_j - \zeta_0) + \arctan\left(\frac{Q(\zeta_0)}{I(\zeta_0)}\right)\right) \quad (35)$$

The surface reflection light components are items when j=0 in Expression 34 and Expression 35, and are represented as the following expressions.

$$I_{fit,0}(z) = \alpha_0 \frac{\sin(k_{eff}(z-\zeta_0))}{k_{eff}(z-\zeta_0)} \cos\left(k_{eff}(z-\zeta_0) + \arctan\left(\frac{Q(\zeta_0)}{I(\zeta_0)}\right)\right) \quad (36)$$

$$Q_{fit,0}(z) = \alpha_0 \frac{\sin(k_{eff}(z-\zeta_0))}{k_{eff}(z-\zeta_0)} \sin\left(k_{eff}(z-\zeta_0) + \arctan\left(\frac{Q(\zeta_0)}{I(\zeta_0)}\right)\right) \quad (37)$$

The signal processing unit 523 subtracts the surface reflection light components given by Expression 36 and Expression 37 from the detection signals, and the sum-of-squares operation is performed on these detection signals to obtain the imaging signal sig(z).

$$\text{sig}(z) = [I(z) - I_{fit,0}(z)]^2 + [Q(z) - Q_{fit,0}(z)]^2 \quad (38)$$

In the present embodiment, by optimizing the surface reflection light components to be subtracted, since the influence of the surface reflection light can be suppressed with higher precision as compared to the first embodiment, it is possible to more vividly visualize the structure near the surface of the measurement target.

What is claimed is:

1. An optical measurement apparatus comprising:
   a light source that emits a laser beam;
   a beam splitter to branch the laser beam into a first signal light and a first reference light;
   an objective lens that condenses the first signal light on a measurement target to cause the measurement target to be irradiated;
   an actuator that scans the first signal light on the measurement target;
   an interference optical system that receives the first signal light from the measurement target combined with the first reference light from the beam splitter, and generates three or more interfering light beams having phase relationships different from one another;
   a plurality of photodetectors that detect the three or more interfering light beams, and output a plurality of detection signals as electrical signals; and
   a signal processing unit that subtracts reflection light components from a predetermined portion of the measurement target from the plurality of detection signals or signals generated using the detection signals, and performs a predetermined arithmetic operation on signals obtained through the subtraction to generate an imaging signal, and
   wherein the signal processing unit performs the subtraction and the predetermined arithmetic operation according to the following expression:

$$\text{sig}(z) = [I(z) - I_0(z)]^2 + [Q(z) - Q_0(z)]^2 \quad (17)$$

where sig(z) is the imaging signal, I(z) and Q(z) are differential detection signals output from the photodetectors, and $I_0(z)$ and $Q_0(z)$ are surface reflection signals.

2. The optical measurement apparatus according to claim 1, wherein the objective lens has a numerical aperture of 4 or more.

3. The optical measurement apparatus according to claim 1,
   wherein the interference optical system generates four interfering light beams,
   wherein the photodetectors are current differential photodetectors,
   wherein the first signal light and the first reference light have different interference phases from each another by an integer multiple of approximately 90 degrees, and
   wherein a first one and a second one of the interfering light beams, in which the first signal light and the first reference light have interference phases different from each another by approximately 180 degrees, are respectively detected by a first one of the photodetectors, and a third one and a fourth one of the interfering light beams, in which the first signal light and the first reference light have interference phases different from each another by approximately 180 degrees, are respectively detected by a second one of the photodetectors.

4. The optical measurement apparatus according to claim 1, further comprising:
   a mirror that reflects the first reference light from the beam splitter back towards the interference optical system,
   wherein the interference optical system generates four interfering light beams, and
   wherein I(z), Q(z), $I_0(z)$ and $Q_0(z)$ are represented by the following expressions:

$$I(z) = \sum_j |E_{ref} \| A_j| \frac{\sin(k_{eff}(z-z_i))}{k_{eff}(z-z_i)} \cos(k_{eff}(z-z_i) + 2k(z_i - z_{ref})), \quad (7)$$

$$Q(z) = \sum_j |E_{ref} \| A_j| \frac{\sin(k_{eff}(z-z_i))}{k_{eff}(z-z_i)} \sin(k_{eff}(z-z_i) + 2k(z_i - z_{ref})), \quad (8)$$

where $Z_{ref}$ is an optical axis direction position of the mirror, and $k_{eff} = \pi * NA^2/\lambda$ where NA is a numerical aperture of the objective lens, $$I_0(z) = |E_{ref} \| A_0| \frac{\sin(k_{eff}(z-z_0))}{k_{eff}(z-z_0)} \cos(k_{eff}(z-z_0) + 2k(z_0 - z_{ref})), \text{ and} \quad (9)$$

$$Q_0(z) = |E_{ref} \| A_0| \frac{\sin(k_{eff}(z-z_0))}{k_{eff}(z-z_0)} \cos(k_{eff}(z-z_0) + 2k(z_0 - z_{ref})). \quad (10)$$

5. The optical measurement apparatus according to claim 1, wherein the reflection light components are generated using previously measured point spread functions when there is an aberration.

6. The optical measurement apparatus according to claim 1, further comprising:
   a second light source that emits light having a different wavelength from that of the laser beam;
   a mirror that reflects the first reference light;
   a piezoelectric element connected to the mirror; and
   a control unit that controls the piezoelectric element to adjust a phase of the first reference light,
   wherein the light emitted from the second light source is branched into a second signal light and a second reference light by the beam splitter, and the interference optical system receives the second signal light combined with the second reference light after respectively passing through same optical paths as the first signal light and the first reference light, and
   wherein the control unit controls the piezoelectric element such that an intensity of interfering light generated by combining the second signal light and the second reference light is substantially constant.

7. The optical measurement apparatus according to claim 6, wherein the second light source is a low coherence light source.

8. The optical measurement apparatus according to claim 1,
wherein the predetermined portion of the measurement target includes a plurality of positions of the measurement target, and
wherein the reflection light components are a sum of reflection light components from the plurality of positions of the measurement target.

9. The optical measurement apparatus according to claim 1, wherein the signal processing unit optimizes the reflection light components using fitting functions.

10. An optical measurement method comprising:
emitting a laser beam from a first light source;
branching the laser beam into a first signal light and a first reference light;
condensing the first signal light on a measurement target to cause the measurement target to be irradiated;
scanning the first signal light on the measurement target;
receives, by an interference optical system, the first signal light from the measurement target combined with the first reference light from the beam splitter;
generating three or more interfering light beams having phase relationships different from one another from the received first signal light and first reference light;
detecting the three or more interfering light beams at a plurality of photodetectors;
outputting a plurality of detection signals as electrical signals from the photodetectors; and
processing the plurality of detection signals, including subtracting reflection light components from a predetermined portion of the measurement target from the plurality of detection signals or signals generated using the detection signals, and performing a predetermined arithmetic operation on signals obtained through the subtraction to generate an imaging signal,
wherein the processing includes the subtraction and the predetermined arithmetic operation according to the following expression:

$$\text{sig}(z) = [I(z) - I_0(z)]^2 + [Q(z) - Q_0(z)]^2 \quad (17)$$

where sig(z) is the imaging signal, I(z) and Q(z) are differential detection signals output from the photodetectors and $I_0(z)$ and $Q_0(z)$ are surface reflection signals.

11. The optical measurement method according to claim 10, wherein the condensing the first signal light includes condensing the first signal light with an objective lens having a numerical aperture of 4 or more.

12. The optical measurement method according to claim 10,
wherein the interference optical system generates four interfering light beams,
wherein the photodetectors are current differential photodetectors,
wherein the first signal light and the first reference light have different interference phases from each another by an integer multiple of approximately 90 degrees, and
wherein pairs of the interfering light beams in which the first signal light and the first reference light have interference phases different from each another by approximately 180 degrees are respectively detected by the photodetectors.

13. The optical measurement method according to claim 10, further comprising:
reflecting the first reference light from the beam splitter back towards the interference optical system with a mirror,
wherein the interference optical system generates four interfering light beams, and
wherein I(z), Q(z), $I_0(z)$ and $Q_0(z)$ are represented by the following expressions:

$$I(z) = \sum_j |E_{ref} \, \| \, A_j| \frac{\sin(k_{eff}(z-z_i))}{k_{eff}(z-z_i)} \cos(k_{eff}(z-z_i) + 2k(z_i - z_{ref})), \quad (7)$$

$$Q(z) = \sum_j |E_{ref} \, \| \, A_j| \frac{\sin(k_{eff}(z-z_i))}{k_{eff}(z-z_i)} \sin(k_{eff}(z-z_i) + 2k(z_i - z_{ref})), \quad (8)$$

where $Z_{ref}$ is an optical axis direction position of the mirror, and $k_{eff} = \pi * NA^2/\lambda$ where NA is a numerical aperture of the objective lens, $$I_0(z) = |E_{ref} \, \| \, A_0| \frac{\sin(k_{eff}(z-z_0))}{k_{eff}(z-z_0)} \cos(k_{eff}(z-z_0) + 2k(z_0 - z_{ref})), \text{ and} \quad (9)$$

$$Q_0(z) = |E_{ref} \, \| \, A_0| \frac{\sin(k_{eff}(z-z_0))}{k_{eff}(z-z_0)} \cos(k_{eff}(z-z_0) + 2k(z_0 - z_{ref})). \quad (10)$$

14. The optical measurement method according to claim 10, further comprising:
measuring point spread functions when there is an aberration; and
generating the reflection light components using the point spread functions.

15. The optical measurement method according to claim 10, further comprising:
emitting light having a different wavelength from that of the laser beam from a second light source;
reflecting the first reference light with a mirror; adjusting a phase of the first reference light,
wherein the light emitted from the second light source is branched into a second signal light and a second reference light by the beam splitter, and the interference optical system receives the second signal light combined with the second reference light after respectively passing through same optical paths as the first signal light and the first reference light, and
wherein the phase of the first reference light is adjusted such that an intensity of interfering light generated by combining the second signal light and the second reference light is substantially constant.

16. The optical measurement method according to claim 15, wherein the emitting light having a different wavelength includes emitting light having a different wavelength from a low coherence light source as a second light source.

17. The optical measurement method according to claim 10,
wherein the subtracting reflection light components from a predetermined portion of the measurement target includes subtracting reflection light components from a plurality of positions of the measurement target, and
wherein the reflection light components are a sum of reflection light components from the plurality of positions of the measurement target.

18. The optical measurement method according to claim 10, further comprising:
  optimizing the reflection light components using fitting functions.

* * * * *